Dec. 30, 1947.    D. W. SHERMAN    2,433,630
WELD FABRICATED TRUNNION FOR LANDING GEAR OLEOS
Filed Jan. 27, 1944    2 Sheets-Sheet 1

Donald W. Sherman
INVENTOR.

BY *Elvin A. Andrus*
ATTORNEY.

Dec. 30, 1947. D. W. SHERMAN 2,433,630
WELD FABRICATED TRUNNION FOR LANDING GEAR OLEOS
Filed Jan. 27, 1944 2 Sheets-Sheet 2

Donald W. Sherman
INVENTOR.

BY *[signature]*

ATTORNEY.

Patented Dec. 30, 1947

2,433,630

UNITED STATES PATENT OFFICE 2,433,630

WELD FABRICATED TRUNNION FOR LANDING GEAR OLEOS

Donald W. Sherman, Shorewood, Wis., assignor to A. O. Smith Corporation, Milwaukee, Wis., a corporation of New York Application January 27, 1944, Serial No. 519,941

13 Claims. (Cl. 244—100)

This invention relates to a weld fabricated trunnion for landing gear oleos and particularly to a trunnion that may be employed as a cross arm member in airplane landing gears.

The invention seeks to replace forged trunnions by providing a trunnion of pressed sheet metal members welded together at several meeting lines.

The principal object of the invention is to provide a pressed sheet metal trunnion of light weight and of substantial rigidity and strength.

Another object is to provide a pressed sheet metal trunnion of a novel design and shape that permits effective welding reinforcement of the structure.

Another object is to provide a trunnion that may be fabricated by mass production methods with less costly equipment and labor.

These and other objects of the invention appear in the following description of an embodiment of the invention illustrated in the accompanying drawings.

Figure 1:
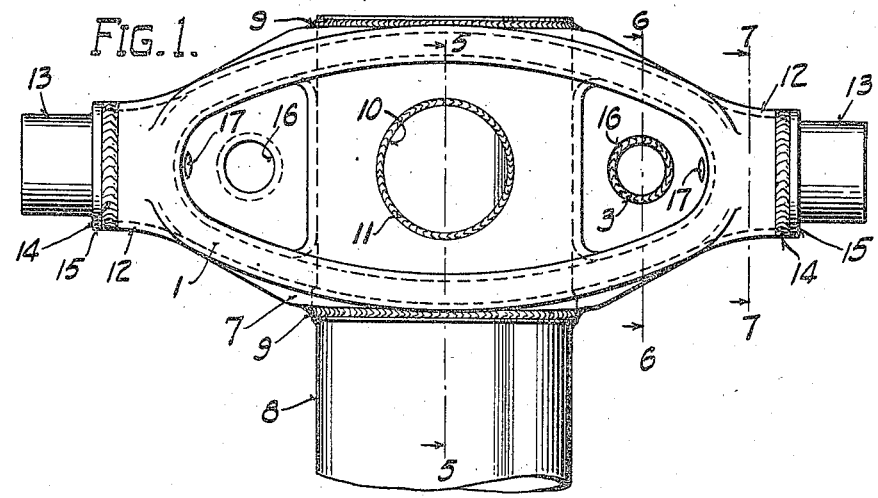
Figure 1 is a side elevational view of a trunnion with an oleo casing unit assembled therewith.
Figure 2:
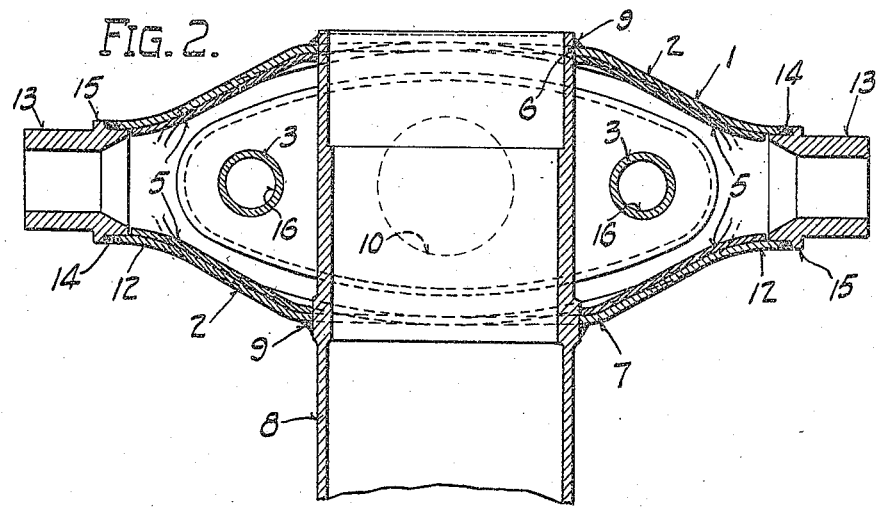
Fig. 2 is a longitudinal sectional view of the trunnion.
Figure 3:
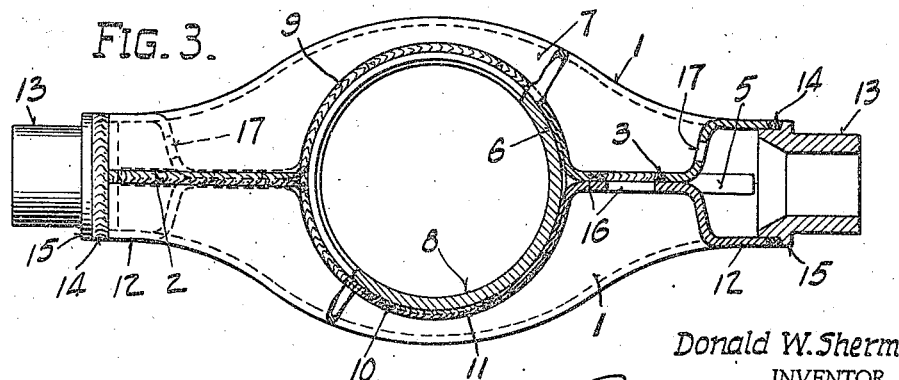
Fig. 3 is a top plan view of the trunnion partly in section.
Figure 4:
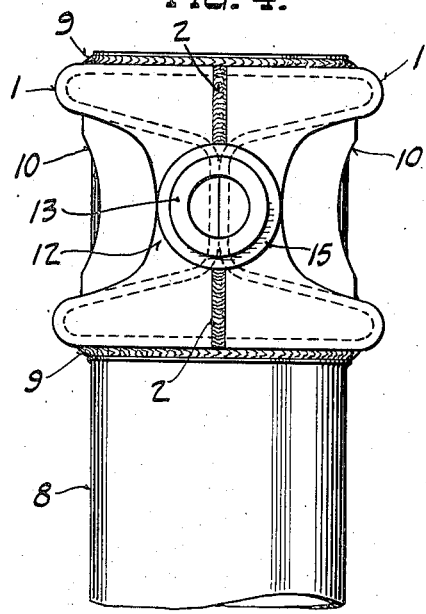
Fig. 4 is an end view of Fig. 1.
Figure 5:
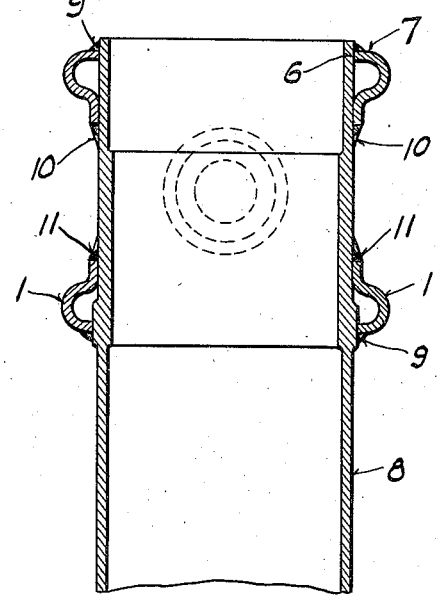
Fig. 5 is a central section taken on line 5—5 of Fig. 1.
Figure 6:
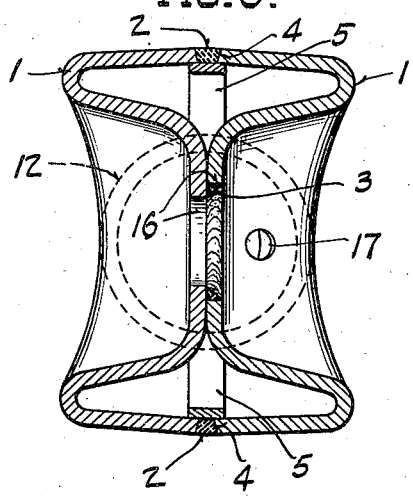
Fig. 6 is a section taken through one of the fillet openings on line 6—6 of Fig. 1.
Figure 7:
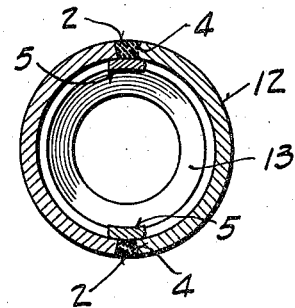
Fig. 7 is a section taken on line 7—7 of Fig. 1.

Referring to the drawings, the trunnion illustrated comprises generally two substantially semi-cylindrical sheet metal members 1 forming the trunnion housing and joined along a longitudinally extending outer meeting line by the weld 2 and at their central meeting areas by the fillet welds 3.

The longitudinal outer meeting line of the housing members 1 preferably extends along the top and bottom of the trunnion and the members at the butt meeting joint form a V-shaped welding groove 4 for receiving the weld metal 2.

The weld 2 is preferably made by electric arc welding by which weld metal is deposited in the welding groove 4 to join the housing members 1 of the trunnion together. Chill strips 5 are preferably disposed inside the weld joint and close the bottom of the welding groove 4 to better receive the weld metal.

The weld 2 and chill strips 5 extend longitudinally from one end of the trunnion to the other along a central line in the bottom and top thereof with the exception of the interruption by the substantially large cylindrical opening 6 vertically extending through the central wall 7 of the trunnion.

The central part 7 of the trunnion bulges outwardly sufficiently to receive the oleo casing unit 8 within the vertically disposed opening 6.

Oleo 8 is welded to the top and bottom of the trunnion respectively by the circumferential welds 9 disposed at the opposite ends of opening 6 between the oleo and the trunnion wall.

A circular opening 10 of lesser diameter than vertical opening 6 extends horizontally through each side wall of the trunnion, and oleo 8 is welded to the side walls of the trunnion by the fillet welds 11 circumferentially disposed around each opening 10 between the oleo casing and trunnion wall.

The trunnion tapers from a substantial bulge in cross section around the central vertical opening 6 to considerably lesser cross section at the respective bearing ends 12. As shown in the drawings the trunnion is also formed with hollow ribs or outwardly formed ridges which extend longitudinally thereof from substantially end to end along the lower and upper end portions.

The trunnion plugs 13 are cylindrical forgings welded into each of the bearing ends 12 by the circumferential welds 14. Each plug 13 extends inside the trunnion end 12 a slight distance and has a circumferential shoulder or flange 15 which is slightly spaced from the inner end to form a circumferential welding groove. Weld metal is deposited in the circumferential welding groove, preferably by electric arc welding to provide the respective welds 14 and join each plug 13 and trunnion bearing end 12 together.

The inner end of each plug 13 is slightly removed from the outer end of the chill strips 5 inside welding joint 2 to permit the welds 14 to contract upon cooling without creating stress therein.

The trunnion housing members 1 besides meeting at the longitudinal outer weld line 2 are also disposed in engagement at a central area on either side of the outwardly bulged central part 7 and between it and the respective trunnion bearing ends 12.

In the engagement area described, the trunnion members are welded together, by arc deposited welds 3 which are preferably fillet welds disposed around the openings 16 extending horizontally through the trunnion wall. The openings 16 are employed to lighten the weight of the trunnion although the members 1 might well be welded together by employing an opening through only one of the members. Where the openings 16 are utilized, one of the openings is of greater diameter than the other to provide a ledge to receive weld 3. The weld 3 serves to stabilize the structure by transmitting shear forces between the two members 1.

The apertures 17 may be disposed in the trunnion between each of the bearing ends 12 and horizontal openings 16.

In fabricating the trunnion, the sheet metal members 1 are pressed to shape from suitable gauge sheet metal. After the members have been assembled and welded together along outer and inner meeting lines, and the trunnion plugs 13 welded into the trunnion bearing ends 12 as described, the several welds of the trunnion structure are trimmed off and the trunnion is preferably subjected to heat treatment to improve the strength of the welds and adjacent metal.

The trunnion is then assembled with the oleo casing 8. The end of the oleo casing is inserted through the central opening 6 of the trunnion, and the circumferential welds 9 are made at each end of the opening to secure the oleo casing and trunnion together. In addition, the circumferential welds 11 are made around each end of horizontal opening 10 extending through the sides of the trunnion housing and disposed transversely of opening 6 to join the mid-section of the trunnion to the oleo casing.

The welds 11 take the vertical shear loads and prevent bending strains in the members. The attachment of the trunnion to the oleo casing 8 by welds effects a unitary operation and functioning of the two parts, each strengthening the other against operating forces, a feature not present in prior structures in which bolts were employed to secure a cross arm to the oleo.

The invention provides a pressed steel trunnion of a novel shape that not only is welded along longitudinal outer lines, but is additionally welded at central meeting areas to reinforce the same and provide a strong light-weight trunnion.

Various embodiments of the invention may be employed within the scope of the accompanying claims.

I claim:

1. A trunnion for a landing gear oleo and the like, comprising a pressed metal tubular trunnion body having cylindrical ends and a bilged central portion and provided by complementary members engaging each other along longitudinal meeting lines in the central vertical axial plane of the trunnion, said bilged central portion having an opening for receiving the oleo, a weld joining the complementary members along said meeting lines, trunnion bearings assembled to the opposite ends of said body, and circumferential welds joining the bearings to said ends.

2. In a landing gear for airplanes, a cross arm of pressed metal construction comprising complementary members engaging each other along longitudinal meeting lines in the central vertical axial plane of the cross arm and having a central bilged portion with a vertical opening therethrough and reduced circular ends, a weld joining the members together along said meeting lines, trunnion bearings assembled with said ends, circumferential welds joining the bearings to said ends, and an oleo casing extending through openings in said bilged central portion, and circumferential welds joining the oleo to said cross arm at the upper and lower ends of said opening.

3. A hollow pressed steel trunnion comprising two complementary trunnion members engaging each other along a longitudinally extending outer meeting line in the central vertical axial plane of the trunnion and at an intermediate inner meeting line in the central portions thereof and welds joining said trunnion members together along said meeting lines.

4. In a hollow pressed steel trunnion, two complementary trunnion members, a weld securing said members together along a longitudinally extending outer line in the central vertical axial plane of the trunnion, and a weld joining the members together at a circular line intermediate the central portion of the trunnion and at least one of the trunnion ends.

5. In an oleo assembly having a hollow pressed steel trunnion comprising two complementary trunnion members, a weld joining said members together along an outer longitudinal meeting line in the central vertical axial plane of the trunnion, said trunnion having a vertical opening through the central portion thereof, an oleo casing unit disposed in said opening, and circumferential welds securing the oleo casing unit to the trunnion at each end of the vertical opening.

6. In an oleo assembly having a hollow pressed steel trunnion comprising two complementary trunnion members, a weld joining said members together along an outer longitudinal meeting line in the central vertical axial plane of the trunnion, said trunnion having a vertical opening through the central portion thereof, an oleo casing unit disposed in said opening, circumferential welds securing the oleo casing unit to the trunnion at each end of the vertical opening, and a weld joining the members together at a circular line intermediate the central portion of the trunnion and each end thereof.

7. In an oleo assembly having a hollow pressed steel trunnion comprising two complementary trunnion members, a weld joining said members together along an outer longitudinal meeting line in the central vertical axial plane of the trunnion, said trunnion having a vertical opening through the central portion thereof and a horizontal opening extending transversely of said vertical opening, an oleo casing unit disposed in said opening, and circumferential welds provided at each end of the vertical opening and at each end of said horizontal opening to secure the oleo casing unit within the trunnion.

8. A trunnion for landing gear oleos comprising a pair of complementary pressed metal members each extending for substantially the full length of the trunnion and of irregular pan shape with hollow outwardly formed ridges extending longitudinally along the upper and lower edges thereof and engaging each other with their corresponding edges along longitudinal meeting lines in the central vertical axial plane of the trunnion, a butt weld joining the members along said longitudinal lines on opposite sides of a banjo opening centrally therebetween, an oleo casing extending through said trunnion in said banjo opening, welds joining the oleo casing to said members around the casing at circumferential lines substantially spaced axially of the casing, trunnion members assembled with the reduced tubular ends of the trunnion, and circumferential welds joining said trunnion members to the ends of the trunnion.

9. A trunnion for landing gear oleos comprising a cylindrical oleo casing, a pair of complementary pressed metal members extending at right angles to said casing on opposite sides thereof, welds joining said members at their ends along a central vertical axial plane to provide aligned transverse trunnions therefor, said oleo casing extending through an opening between said members and the latter being expanded centrally thereof to provide spaced flange members engaging the oleo casing circumferentially at lines substantially spaced apart axially of the casing, and welds joining said members to the oleo casing at said circumferential lines.

10. A trunnion for landing gear oleos comprising a cylindrical oleo casing, a pair of complementary pressed metal members extending at right angles to said casing on opposite sides thereof, welds joining said members at their ends along a central vertical axial plane to provide aligned transverse trunnions therefor, said oleo casing extending through an opening between said members and the latter being expanded centrally thereof to provide spaced flange members engaging the oleo casing circumferentially at lines substantially spaced apart axially of the casing, welds joining said members to the oleo casing at said circumferential lines, trunnion members assembled with the opposite ends of said complementary members, and circumferential welds joining the trunnion members to said complementary members at the ends of the latter.

11. A trunnion for landing gear oleos comprising a cylindrical oleo casing, a pair of complementary pressed metal members extending at right angles to said casing on opposite sides thereof, welds joining said members at their ends along a central vertical axial plane to provide aligned transverse trunnions therefor, said oleo casing extending through an opening between said members and the latter being expanded centrally thereof to provide spaced flange members engaging the oleo casing circumferentially at lines substantially spaced apart axially of the casing, and welds joining said members to the oleo casing at said circumferential lines, said pressed metal members being flanged at their opposite longitudinal edges with the corresponding flanges facing each other, and welds securing said flanges together along a longitudinal center line between the oleo casing and the trunnion ends.

12. A trunnion for landing gear oleos comprising a cylindrical oleo casing, a pair of complementary pressed metal members extending at right angles to said casing on opposite sides thereof, welds joining said members together at their ends along a central vertical axial plane to provide aligned transverse trunnions therefor, said oleo casing extending through an opening between said members and the latter being expanded centrally thereof to provide spaced flange members engaging the oleo casing circumferentially at lines substantially spaced apart axially of the casing, welds joining said members to the oleo casing at said circumferential lines, said pressed metal members being flanged at their opposite longitudinal edges with the corresponding flanges facing each other, welds joining said flanges together along a longitudinal center line between the oleo casing and the trunnion ends and the body webs of said members being depressed inwardly toward one another on opposite sides of the oleo casing to engage the latter, and welds joining said webs to the oleo casing.

13. A trunnion for landing gear oleos comprising a cylindrical oleo casing, a pair of complementary pressed metal members extending at right angles to said casing on opposite sides thereof, welds joining said members together at their ends along a central vertical axial plane to provide aligned transverse trunnions therefor, said oleo casing extending through an opening between said members and the latter being expanded centrally thereof to provide spaced flange members engaging the oleo casing circumferentially at lines substantially spaced apart axially of the casing, welds joining said members to the oleo casing at said circumferential lines, said pressed metal members being flanged at their opposite longitudinal edges with the corresponding flanges facing each other, welds joining said flanges together along a longitudinal center line between the oleo casing and the trunnion ends and the body webs of said members being depressed inwardly toward one another on opposite sides of the oleo casing to engage the latter, and welds joining said webs to the oleo casing, said webs encircling said casing, and welds joining said webs together at a location intermediate the oleo casing and the ends of the trunnion.

DONALD W. SHERMAN.

REFERENCES CITED

The following references are of record in the file of this patent:

UNITED STATES PATENTS

| Number | Name | Date |
|---|---|---|
| 1,818,891 | Hill | Aug. 11, 1931 |
| 2,148,714 | Urschel | Feb. 28, 1939 |
| 1,967,317 | Mogford et al. | July 24, 1934 |
| 1,127,399 | Burkhardt | Feb. 9, 1915 |
| 1,209,134 | Dodge | Dec. 19, 1916 |
| 2,092,472 | Rafter | Sept. 7, 1937 |
| 1,692,932 | Ford | Nov. 27, 1928 |
| 1,991,199 | Eisele | Feb. 12, 1935 |
| 2,170,797 | Glover | Aug. 29, 1939 |